United States Patent

[11] 3,625,466

[72] Inventors Philip Marshall
Lexington;
Joseph C. Boeggeman, Beverly, both of Mass.
[21] Appl. No. 65,592
[22] Filed Aug. 20, 1970
[45] Patented Dec. 7, 1971
[73] Assignee Marshall Research & Development Corp.
Burlington, Mass.

[54] VIBRATION ISOLATOR
12 Claims, 7 Drawing Figs.

[52] U.S. Cl. ............................................. 248/358 R,
188/1 B, 248/20, 267/158
[51] Int. Cl. .............................................. F16f 15/04
[50] Field of Search .................................... 248/358 R,
15, 18, 20, 21; 188/1 B; 267/158

[56] References Cited
UNITED STATES PATENTS

| 2,359,941 | 10/1944 | Rosenzweig | 248/21 |
| 3,057,592 | 10/1962 | Thrasher | 248/358 |
| 3,066,905 | 12/1962 | Gertel | 248/358 |
| 3,151,833 | 10/1964 | Thrasher | 248/358 |
| 3,565,386 | 2/1971 | Lemkuil | 248/358 |

*Primary Examiner*—J. Franklin Foss
*Attorney*—Irving S. Rappaport

ABSTRACT: A vibration isolator suspension element for use in a vibration isolating system. The suspension element comprises first and second sets of parallel, spaced-apart U-springs which longitudinally extend at right angles and in parallel planes to one another. Means are provided for connecting the sets of U-springs in series relation as well as means for mounting the element to both a supporting structure and to a mass to be supported. The element is also provided with integral means for providing friction damping during both translational and rotational motion to which the mass may be subjected.

PATENTED DEC 7 1971

PHILIP MARSHALL
JOSEPH C. BOEGGEMAN
INVENTORS.

BY Irving S. Rappaport

ATTORNEYS.

PHILIP MARSHALL
JOSEPH C. BOEGGEMAN
INVENTORS.

BY Irving S. Rappaport

ATTORNEYS.

PHILIP MARSHALL
JOSEPH C. BOEGGEMAN
INVENTORS.

BY Irving S. Rappaport

ATTORNEYS.

VIBRATION ISOLATOR

This invention relates to vibration isolation systems generally and more particularly, to a novel and improved vibration isolator with an integrally formed friction damper.

Vibration isolators are used to reduce the magnitude of vibratory forces transmitted from one member or element to another member or element. It may be desired to reduce the magnitude of forces transmitted from a supported element to its supporting structure or vice versa. While not necessarily limited thereto, this invention is concerned with reducing the magnitude of vibration forces transmitted from a supporting structure to a supported device.

In such prior art devices as characterized by U.S. Pat. No. 3,066,905 vibration isolation in the form of friction damping, has been provided for the supported device with respect to the usual three coordinates of translational vibration. However, no such vibration isolation in the form of friction damping has been provided for the three coordinates of rotational or angular vibration. In U.S. Pat. No. 3,066,905 the friction dampers are separate thrust-type units not integrally formed with the whole isolator unit and are focused at the elastic center of the system. By focusing these thrust-type friction dampers at the elastic center of the system, friction damping for translational, but not for rotational, motion is obtained. Since the dampers are focused at the elastic center for torsional or rotational motion where the moment arm between the friction force and the axis of rotation is zero, there is no friction moment and therefore no frictional damping during rotational motion. Friction damping during rotation is not provided in U.S. Pat. No. 3,066,905 because of the rotational hysteresis created in the rotational motion of a guidance system or stable platform holding a gyro with respect to the mounting base. This hysteresis may result in an angular lag across the isolator unit between the base and the isolated platform. However, we have discovered that under vibration this angular lag disappears very rapidly regardless of the application of friction damping during rotational motion. Therefore, the present invention provides frictional damping for both translational and rotational motion.

Further, the thrust-type friction dampers disclosed in U.S. Pat. No. 3,066,905 are the type which use a spring wrapped around the unit. In order to change the friction setting the spring must be removed and physically shortened or lengthened appropriately so as to apply the correct pressure to obtain the desired frictional damping. Another disadvantage of these thrust-type friction dampers is that they are not integral with the isolator unit, thereby requiring more space and resulting in a unit of greater size and weight. This is a severe disadvantage especially in aircraft and missile applications where size and weight considerations are of paramount importance. Also, in the prior art unit the U- or C-springs of the isolator are riveted to the plates so that the spring rate of each spring is not readily controllable because the damping force of the rivets is highly variable.

It is an object of the present invention to provide a new and improved vibration isolator assembly for isolating and damping a supported device from the three coordinates of translational motion and from the three coordinates of rotational motion.

Another object of the present invention is to provide a vibration isolator assembly in which friction dampers are integrally formed with the isolator assembly.

Still another object of the present invention is to provide a vibration isolator with integral friction damping which eliminates extraneous brackets and support surfaces resulting in a more compact and lighter weight unit.

Yet another object of the present invention is to provide a vibration isolator system which is balanced and fully decoupled.

A further object of the present invention is to provide a vibration isolator assembly using springs to provide vibration isolation in which the spring rate of each spring may be accurately controlled.

The above objects advantages and features of the present invention, as well as others, are accomplished by providing a vibration isolator suspension element for use in a vibration isolating system comprising: a first set of parallel spaced-apart U-springs; a second set of parallel spaced-apart U-springs longitudinally extending at right angles to the first set of U-springs and in general plane extending parallel to the general plane of the first set of U-springs; means for connecting said first and second set of U-springs in series relation; means for mounting one end of said suspension element on a supporting structure; means for mounting on the other end of said suspension element a mass to be supported; and means provided integrally with said suspension element for providing friction damping during both translational and rotational motion to which said supported mass may be subjected.

Other objects of the invention will, in part, be obvious and will, in part, appear hereinafter. The invention accordingly comprises the apparatus possessing the construction, combination of elements, and arrangement of parts which are amplified in the following detailed disclosure and the scope of the application which will be indicated in the claims.

For a fuller understanding of the nature and objects of the present invention, reference should be had to the following detailed description taken in connection with the accompanying drawings herein:

Figure 1:
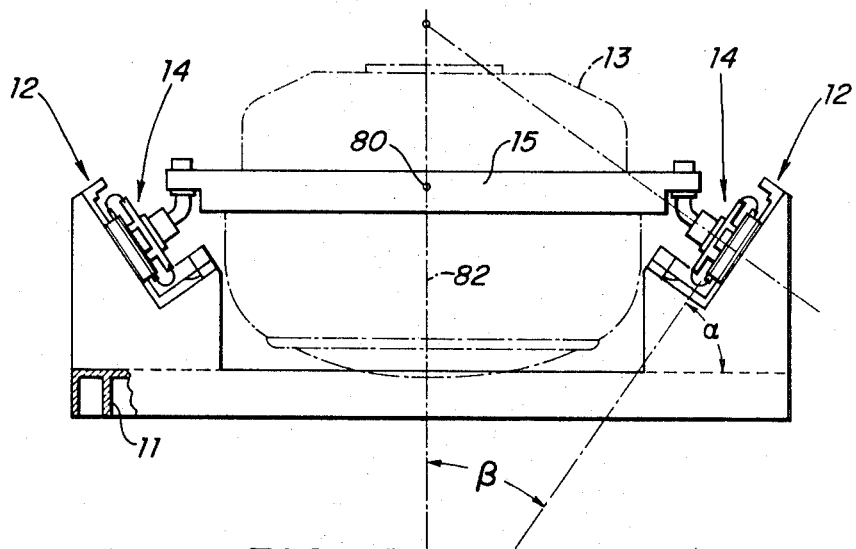
FIG. 1 is a partial cross-sectional view of a vibration isolation system employing the vibration isolator of the present invention.
Figure 2:
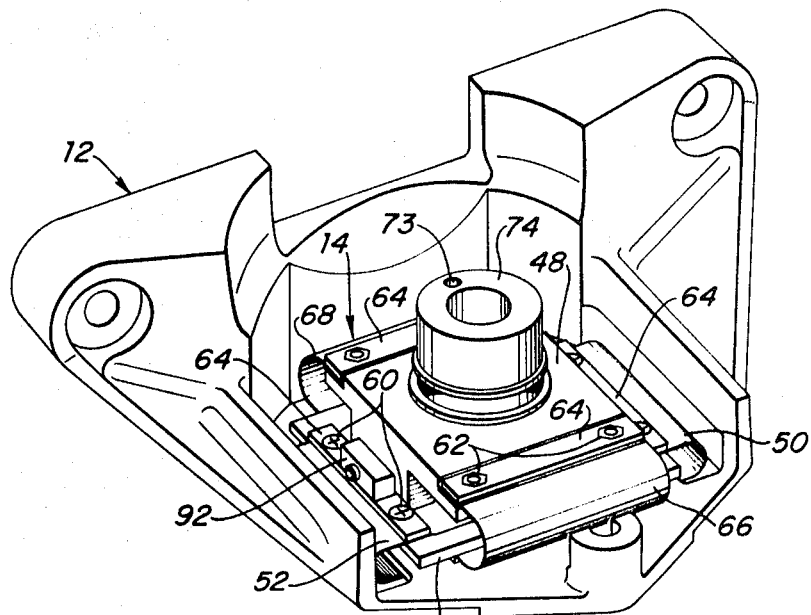
FIG. 2 is an isometric view of a vibration isolator of the present invention.

FIG. 1 shows one example of an application of the vibration isolator of the present invention. In this application of the vibration isolator 10 of the present invention, typically a base or structure 11 as seen in FIG. 1 for supporting and isolating a mass 13, such as a navigational instrument or device, has mounted thereon a plurality of angularly spaced-apart brackets such as illustrated by a bracket 12. Each bracket has mounted thereon a spring suspension element generally indicated at 14. The spring suspension elements are each connected to a supporting or mounting ring or member 15 which is adapted to support the mass to be isolated. This mass 13 may be a navigational instrument or the like. The spring suspension elements provide the sole support of the mass being isolated and also provide the isolation of the mass from vibration. Friction damping is provided during both translational and rotational motion by a plurality of friction dampers one of which is indicated generally at 16 in FIG. 3. Friction dampers 16 are formed integrally with the spring suspension element 14 and as a part of the overall isolator unit 10.

In understanding the present invention, the nature and construction of the spring suspension elements 14 should be considered. Each of these suspension elements comprises a plurality of supporting and isolating elements each of which is U-shaped and which will be hereinafter referred to as U-springs. By a U-spring is meant a generally channel-shaped member having a resiliently deformable web portion which in cross section is redirected in the sense of a U-shape, cross section, or in the sense of cross sections such as are often referred to as sinuous or corrugated cross sections. The characterizing feature of a U-spring, for the purpose of this invention, is that it is resiliently flexible in a cross-sectional plane both in a first direction, wherein the web portion tends to be compressed or elongated, and a second direction extending at right angles to the first direction, wherein the web is skewed so that the opposite ends of the web tend to be laterally offset from each other, and is at least substantially stiffer, if not substantially rigid, in the direction extending at right angles to the cross-sectional plane of the U-spring. In each suspension element there are at least two U-springs which are angularly offset so that the cross-sectional plane of one U-spring extends at right angles to the cross-sectional plane of the other U-spring. One of the ends of each of the U-springs is rigidly connected to one of the ends of the other U-spring so that the two springs are arranged in series relation. The other end of one of the U-springs is rigidly connected to means for mounting the mass to be supported and isolated, and this end of the series arranged U-springs in each of the angularly spaced-apart suspension elements is rigidly connected to the corresponding ends of the other series arranged U-springs in the remaining suspension elements. The other end of the other U-spring in each series arranged pair thereof is rigidly connected to a common base or supporting structure.

The U-springs or suspension elements provide the sole resilient support of the mass being isolated as well as providing the vibratory isolation of the mass. The friction dampers provide the desired friction damping during both translational and rotational motion of the mass. The suspension elements and friction dampers are preferably arranged relative to the mass being supported to provide a fully decoupled isolation system. By a fully decoupled isolation system is meant a vibratory isolation system (1) wherein the elastic center of the system coincides with the center of gravity of the mass being supported (this decouples the spring suspension elements), and (2) wherein the application of motion in any direction generates friction forces or moments only in the direction of the applied motion and not in the direction of the other five coordinates of motion (this decouples the friction dampers). By the term elastic center is meant the point in a system of spring supports to which a linear force may be applied from any direction with a resulting purely translational movement of the mass supporting structure of the system. Thus, in a decoupled isolation system, a linear force exerted on the center of gravity of the supported mass from any direction will result a pure translational movement of the mass with no angular component of movement. When a U-spring isolation system of the type described is used to support a mass such as a navigational device having an azimuth axis, the suspension elements are preferably arranged relative to the azimuth axis of the system and the center of gravity of the mass being supported and are constructed to provide a decoupled system. While linear forces on the supported device will tend to result in pure translational movement of the device, a rotational input force applied to the device will, of course, tend to provide angular movement of the device either about its azimuth axis or about an axis extending at right angles thereto, which will be referred to as a tilt axis, The tilt axis may correspond to one of the axes generally referred to as the pitch and roll axes, or an axis spaced angularly between the pitch and roll axes. By arranging the suspension elements in a predetermined relation with respect to the azimuth axis, so as to arrange the series connected U-springs in either parallel or perpendicular relation with respect to the azimuth axis or inclined relative to the azimuth axis, the system may be provided with significantly increased stiffness with respect to movement of the device about a selected one of the azimuth or tilt axes or with respect to both the azimuth and a tilt axis. This increased stiffness may be particularly desirable in the case of a navigational device, where it is desired to provide as little movement of the device as possible about either or both the azimuth and/or the tilt axes. In the case of a navigational device, it may also be desirable to assure that following angular displacement of the device about either the azimuth axis or a tilt axis the device will be returned by the suspension elements to its initial position with a high degree of accuracy.

It is necessary, of course, that the U-springs provide sufficient stiffness to provide a satisfactory resilient support of the device. Also, it may be desirable to provide for displacements of the mass which are relatively large as compared to the stiffness of the U-spring. Also, it is desirable to provide a U-spring of relatively small dimensions in order to conserve space. Further, it is desirable to provide friction damping in the system, and in this connection, and in the interest of economy and simplicity of construction, the friction dampers are formed integrally with the overall isolator unit. In order to provide a U-spring with the combined features of relatively high stiffness, the ability to operate with relatively large vibratory displacements, and small size, the U-springs are provided in a laminated configuration, wherein each spring comprises a plurality of nested U-spring members. In order to obtain the accurate returnability desired, at least the deformable portions of the U-spring members making up each laminated U-spring are slightly spaced apart to eliminate rubbing contact between the deformable portions of the U-spring members during deformation of the suspension elements. In this manner, any hysteresis effect due to interfacial friction forces resulting from rubbing contact of the U-spring members is eliminated, and a higher degree of angular returnability of the system is provided. The friction dampers are utilized to provide system damping, and need not be focused at the elastic center of the system since we have discovered that any angular lag created by rotational hysteresis disappears very rapidly regardless of the application of friction damping during rotational motion. Since the friction dampers are not focused at the elastic center, the vectors representing the friction forces do not pass through the elastic center. The only requirement as far as the positioning of the friction dampers is concerned is that they must be balanced with respect to the elastic axis. By "balanced" it is not meant that the friction forces applied by the dampers need be equal in all directions but that the application of motion in any direction generates friction forces or moments only in the direction of applied motion and not in the direction of the other five coordinates of motion. Under this definition, there are a number of ways of positioning the friction dampers in the present invention.

Referring now to FIGS. 2-7, bracket 12 is an L-shaped member having a vertical portion 18 and a horizontal portion 20. Vertical portion 18 has an opening 22 passing therethrough near its uppermost end. Horizontal portion 20 has two openings 24 and 26 at opposite sides thereof which pass completely therethrough. Openings 22, 24, and 26 are provided for mounting bracket 12 to the base or support platform (not shown) for the mass which it is desired to support. Vertical portion 18 also has two substantially rectangular-shaped openings 28 and 30 passing therethrough. Openings 28 and 30 permit two of the U-springs of spring suspension element 14 to be positioned and mounted properly with respect to bracket 12. Vertical portion 18 also has a center opening 32 in the form of a hole passing therethrough for the purpose of allowing proper operation of the spring suspension element 14 and support of the mass to be supported as will be described.

To provide the necessary support for the vertical and horizontal portions 18 and 20 of bracket 12, integral side walls 34 and 36 are formed at approximately a 45° angle between portions 18 and 20. Vertical portion 18 also has a pair of flanges 38 and 40 formed adjacent sidewalls 34 and 36, respectively. Sidewalls 34 and 36 and their respective corresponding flanges 38 and 40 have opening 42 and 44 passing therethrough. Openings 42 and 44 permit access to the friction dampers 16 for adjustment thereof as will be described.

The suspension element 14 comprises a plurality of stacked platelike members including the portion of bracket 12 between openings 28 and 30, centerplate 46 and top plate 48. The portion of bracket 12 between openings 28 and 30 and centerplate 46 are resiliently connected by a pair of elongated, spaced-apart U-springs 50 and 52. The bight or web portion 54 of each spring 50 and 52 is shown as being disposed outwardly of the longitudinal edges of centerplate 46 and through opening 28 and 30 in bracket 12. However, it is possible, if desired, to dispose the bight portion of the springs between the plates and inside the longitudinal edges thereof.

Springs 50 and 52 are each fixed to the portion of bracket 12 between openings 28 and 30 by screws 60 and threaded cylindrical inserts or nuts such as shown at 62. Screws 60 pass through backup strips 64, through springs 50 and 52 and through bracket 12. Nuts 62 (not shown) which rest in recesses in the surface of bracket 12 are secured to screws 60 to firmly fix springs 50 and 52 to bracket 12. The heads of screws 60 are recessed in backup strips 64 so that their heads lie flush with the surface of strips 64. Nuts 62, when in place, lie flush with the surface of the inside wall of bracket 12. Similarly, springs 50 and 52 are secured to centerplate 46 by screws 60 and nuts 62 and backup strips 64. With the springs held at one, their ends between bracket 12 and backup strips. 64 and at the other of their ends between plate 46 and backup strips 64, a very firm and secure connection is thus made. By employing as fasteners screws 60 and nuts 62, instead of rivets, the clamping action applied to the ends of the springs to provide good end fixity of the springs can be accurately controlled. Each screw 60 may have a measured torque applied thereto so as to provide an exact and uniform end fixity at each end of springs 50 and 52.

Figure 5:
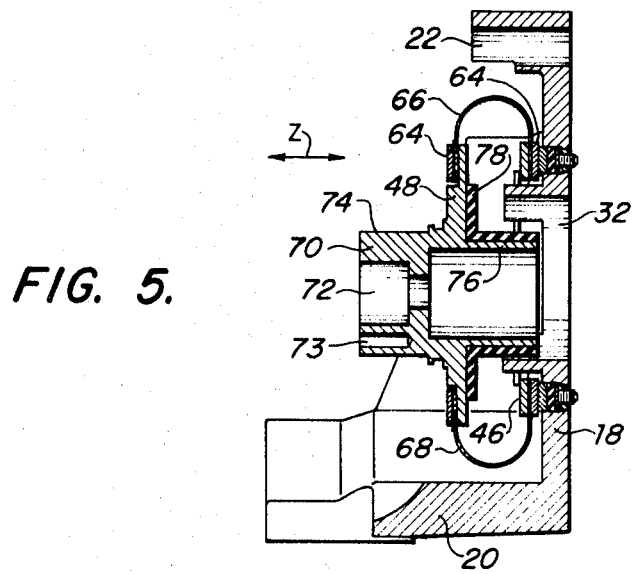
FIG. 5 is a side elevational, cross-sectional view isolator the isolator shown in FIG. 3 taken along the line 5—5.

With the connection of the portion of bracket 12 between openings 28 and 30 and centerplate 46 at their longitudinal edges by oppositely facing U-springs 50 and 52, it will be apparent that with bracket 12 fixed to the base or support platform centerplate 46 will be permitted movement toward and away from bracket 12 wherein the connecting web or bight portion 54 of U-springs 50 and 52 will tend to be compressed or elongated. More specifically, during movement of the plate 46 toward the bracket 12, the cross-sectional configuration of the bight 54 of U-springs 50 and 52 will be deformed from the generally semicylindrical configuration shown in FIG. 3 to a generally semiellipsoid configuration. Also, centerplate 46 will be permitted movement in a direction parallel to the general plane of the surface of bracket 12 and in a direction generally laterally of the U-springs 50 and 52, whereby the opposite ends of the bight portions 54 of the springs will be offset laterally of the springs or, in other words, will assume a generally skewed relation. On the other hand, as will be apparent from the drawings, springs 50 and 52 provide substantially greater stiffness, if not substantial rigidity, X-axis, respect to movement of the plate 46 in a direction parallel to the general plane of portion 18 of bracket 12 and longitudinally of the springs. Also, as will be apparent from the drawings, the springs 50 and 52 provide substantially increased stiffness, if not substantial rigidity, with respect to angular movement of the plate 46 in the general plane of the plate and relative to the bracket 12. The movements of the plate 46 relative to the bracket 12 may be related to the usual three coordinates of translational motion; for example, the lateral movement of the plate 46 in the direction of the horizontal arrow of FIG. 3 may be referred to as motion along the X-axis, while the movement of the plate 46 in the direction toward and away from bracket 12 may be referred to as motion along the Z-axis as shown in FIG. 5. Accordingly, it can also be said that the springs 50 and 52 provide substantially increased stiffness to motion of the plate 46 in the direction of the vertical arrow of FIG. 3 which may be referred to as motion along the Y-axis, and also provide substantially increased resistance to angular movement of the plate 46 about the Z-axis.

The intermediate plate 46 is also connected to the top plate 48 by a set of parallel spaced-apart U-springs including a pair of oppositely facing elongated U-shaped U-springs 66 and 68 generally similar in cross-sectional configuration to the U-springs 50 and 52 previously described. The springs 66 and 68 extend along the end edges of the plates 46 and 48, and their ends are respectively rigidly connected to the plates, by screws 60, nuts 62 and backup strips 64 in the same manner as described above with respect to springs 50 and 52. As should be apparent from FIG. 5, the arrangement and mounting of the U-springs 66 and 68 permit relative movement of the plates toward and away from each other in the direction along the Z-axis. Also, the plates 46 and 48 are permitted relative movement in a direction parallel to the general plane of the plates and generally laterally of the U-springs 66 and 68 in the direction of the arrow of FIG. 3 along the Y-axis. Also, as will be apparent, the U-springs 66 and 68 provide substantially increased stiffness with respect to relative movement of the plates 46 and 48 in a direction generally longitudinally of the springs 66 and 68 or along the X-axis and also provide substantially increased stiffness, if not substantial rigidity with respect to angular movement of the plate 48 about the Z-axis.

Thus, each suspension element comprises a first set of parallel spaced-apart U-springs and a second set of parallel spaced-apart U-springs longitudinally extending in a general plane parallel to the general plane of the first set and arranged at right angles to the first set. The sets of U-springs are connected in series relation with the free ends of the sets being respectively connected to the base 11 and mass 13 as shown in FIG. 1. From the above, it can be seen that with bracket 12 rigidly mounted, the top plate 48 will be permitted resiliently restrained translational movement in all directions within the general plane of the plate and also will be permitted resiliently restrained movement toward and away from the bracket 12. On the other hand, the U-springs 50 and 52 and 66 and 68 will provide substantially increased stiffness with respect to the angular movement of the plate 48 relative to the bracket 12 and in the general plane of the plate 48. In terms of the three coordinates of translational movement, the plate 48 will be permitted resiliently restrained translational movement along the X-, Y- and Z-axes as well as translational movement in any combination of these axes but will be restrained with a substantially increased stiffness with respect to angular movement of the plate 48 about the Z-axis of the suspension element.

The top plate 48 has integrally formed therewith a projection 70 having an opening 72 passing therethrough and an opening 73 which passes partially therethrough. Projection 70 has a portion 74 which extends above the surface of top plate 48 and a portion 76 which extends through the opening 32 in bracket 12. Portion 74 with openings 72 and 73 serve as a means on which the mass to be isolated is mounted or affixed to isolator 10. A rubber snubber 78 surrounds portion 76 of projection 70 and abuts one surface of plate 48. Snubber 78 cushions the portion 76 of projection 78 from any severe shocks to which the isolator 10 may be subjected. Portion 76 and snubber 78 limit movement of plate 48 in the direction parallel to vertical portion 18 of bracket 12 and also in the direction toward vertical portion 18. Although the mass is affixed to isolator 10 by means of projection 70, other means, such as, for example, holes in top plate 48, could be used for affixing the mass to the isolator.

It may be desirable to utilize the isolators 10 in an iso-elastic system as shown in FIG. 1. The term "iso-elastic" is used herein to define a system wherein the system will provide equal stiffness with respect to translational movement of the supported mass along the X-, Y-, and Z-axes of the system as a whole. This system is achieved, in part, in the embodiment in FIG. 1, by inclining the plurality of suspension elements upwardly and outwardly of the base 11 at an acute angle $\alpha$. In the system shown, three equally spaced suspension elements 14 are employed. The angle $\alpha$, as shown in FIG. 1, may be defined as the angle between the general plane of the top plate 48 of the suspension element or the general plane of the suspension element and the general plane base 11. The iso-elastic characteristic of the system is also achieved, in part, by equiangular spacing of the suspension elements about a line extending vertically through the center of gravity of the supported device and perpendicular to the general plane of the base 11.

The center of gravity of the supported device is indicated at 80 in FIG. 1 and may be laterally offset from the geometric center of the mounting ring 15. The spring suspension elements are angularly oriented relative to the center of gravity 80 of the supported device so that the Z-axes of the suspension elements intersect substantially at a point on the vertical line extending through the center of gravity 80 and perpendicular to the general plane of the base 11. The suspension elements are offset vertically below the center of gravity 80 of the supported device a predetermined amount in order to locate the elastic center substantially at the center of gravity to meet the first requirement of a fully decoupled system as previously stated. It will, of course, be apparent that the suspension elements could be inclined in the opposite direction so as to extend upwardly and inwardly of the base 11 in which case the suspension elements would be offset vertically above the center of gravity 80 in order to achieve the desired decoupling.

In an iso-elastic decoupled system constructed as thus far described, the linear forces acting on the supported device will tend to result only in pure translational movement of the device and will be met by equal restraint regardless of the direction of such forces. With respect to rotational input forces, for example, directed angularly about the Z-axis of the system as a whole, the suspension elements will provide substantially increased restraint or stiffness. The Z-axis of the system, in the case of the embodiment of FIG. 1 corresponds to the vertical line 82 passing through the center of gravity 80 and may be referred to as the azimuth axis of the system. Increased azimuth stiffness of the system is in part derived from the high stiffness of the suspension elements with respect to angular displacement of the top plate 48 about the Z-axis of the suspension element, which, of course, is different from the Z-axis of the system as a whole. More specifically, the portion of the azimuth restraint which is attributable to the stiffness of the suspension elements about their Z-axes varies with the cosine squared of the angle $\alpha$. Accordingly, the azimuth stiffness of the system will decrease as the angle $\alpha$ is increased. Also in the embodiment of FIG. 1, the stiffness of the system with respect to angular movements of the device about a tilt axis extending perpendicular to the azimuth axis 82 is substantially increased as compared to the restraint against translational movement. The restraint against angular movement of the supported device about a tilt axis varies as the sine squared of the angle $\alpha$ and thus restraint increases as the angle $\alpha$ is increased. Therefore, in the iso-elastic system of FIG. 1, wherein the suspension elements are inclined at an acute angle to the base 11, the system will afford substantially increased stiffness with respect to angular movements about either the azimuth axis or the tilt axis as compared to the restraint offered with respect to purely translational movement of the supported device along the X-, Y-, Z-axes of the system. It will, of course, also be apparent that with the suspension elements inclined to provide the iso-elastic feature of the system the stiffness with respect to angular movement about he azimuth axis will not be as great as would be the case where the suspension elements lie in a general plane extending parallel to the general plane of the ring 15 so that the Z axes of the suspension elements are parallel to the azimuth axis of the system. With the suspension elements so oriented, the system stiffness about the Z or azimuth axis will be at its maximum, while the system stiffness about a tilt axis will be at its minimum. Also, as will be apparent, the stiffness of the system with respect to angular movement about a tilt axis will not be as great as will be afforded with the suspension elements arranged to lie in a plane extending parallel to the azimuth axis so that the Z-axes of the suspension elements coincide with radii from the azimuth axis. In this orientation of the suspension elements azimuth stiffness of the system will be at its minimum and tilt stiffness at its maximum. It will further be apparent that the inclining of the suspension elements may be defined by an angle $\beta$, which is the angle between the general plane of a suspension element and the azimuth axis 82 of the system, and which angle $\beta$ is the complement of the angle $\alpha$.

In order to provide suspension elements of the requisite stiffness for the support of the device to be isolated, and which will permit displacements of the device which are relatively large with respect to the stiffness of the suspension elements, and at the same time to provide a suspension element of a relatively small size, the U-springs 50, 52, 66 and 68 of the suspension element are provided in a laminated configuration as described in U.S. Pat. No. 3,066,905. More specifically, each U-spring comprises a plurality of nested U-spring members. Each of the U-spring members comprises a bight or web portion which is generally semicylindrical in cross section. Each U-spring member also includes a pair of ends or the like extending from the ends of the bight portions for the mounting of the U-spring elements to the plate members as previously described. The bight or web portions of the U-spring elements may be spaced apart or gapped so as to substantially reduce, if not prevent, rubbing contact between the bight portions during flexure thereof. For example, in a specific embodiment using U-shaped laminates 0.004 inch thick, the webs were gapped 0.002 inch at apex of their apexes. In this manner, interfacial friction within the U-spring is significantly reduced if not substantially eliminated, and accordingly, any hysteresis effect on the system due to such interfacial friction is substantially eliminated. Hysteresis effect of an isolation system refers to the characteristic of the system whereby following displacement of the supported mass from an initial position, the mass is returned by the suspension element to a position perhaps slightly displaced from its original position. In the case of a navigational instrument, it may be particularly desirable to reduce this hysteresis effect with respect to angular displacement of the device about its azimuth axis as well as about any tilt axis, such as a roll or pitch axis.

Figure 3:
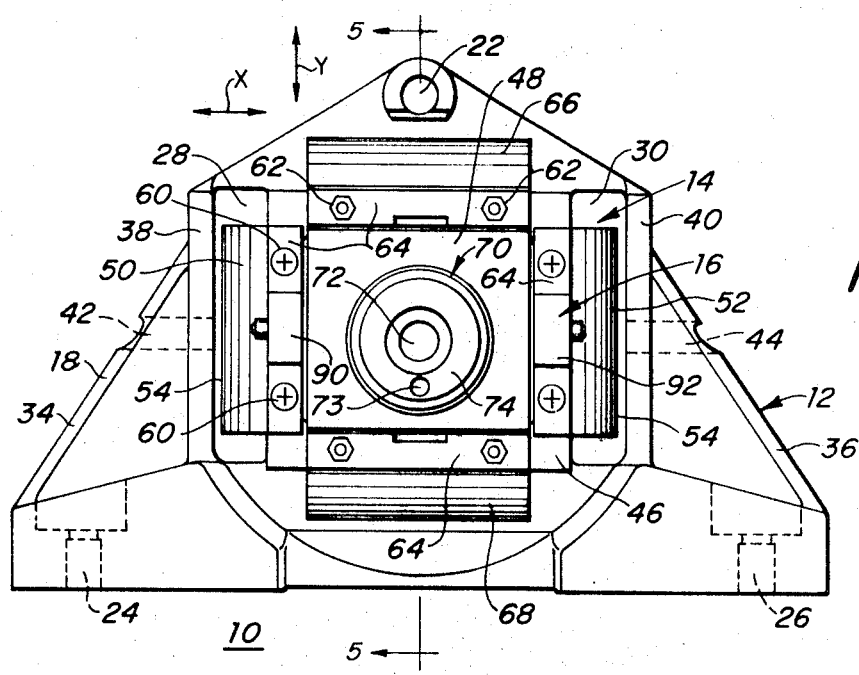
FIG. 3 is a top plan view of the vibrator isolator shown in FIG. 2.
Figure 4:
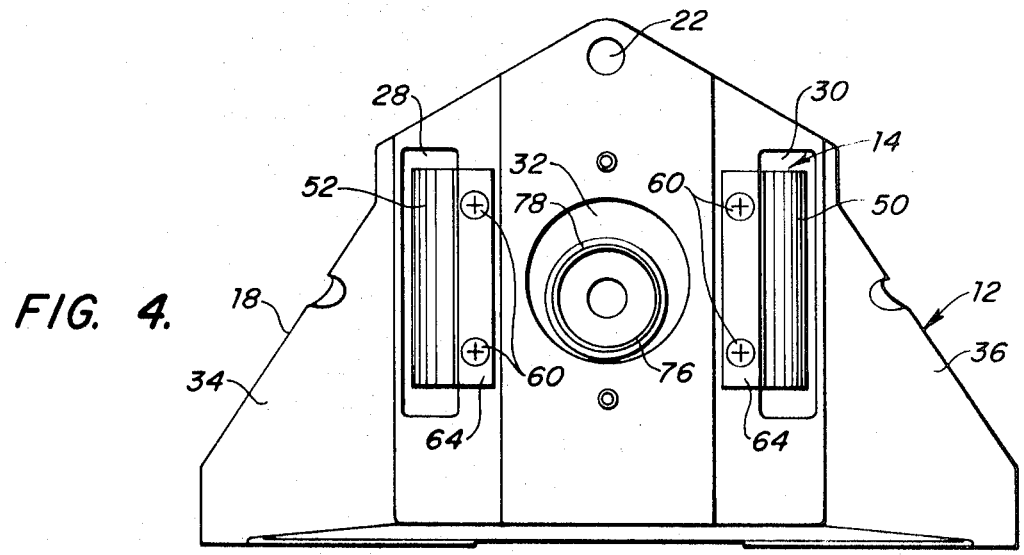
FIG. 4 is a bottom view of the isolator shown in FIG. 2.

In some instances, a reduction in hysteresis effect resulting from friction within the suspension elements 14 may not be as important as providing a relatively high degree of damping within the spring suspension elements. In such an instance, the U-springs may be constructed wherein the laminates, and particularly the deformable bight or web portions thereof, are in nesting contact with each other. With this construction there will, of course, be a larger amount of interfacial friction between the laminates during deformation of the web portions which interfacial friction may provide a relatively high degree of damping in the system. While the laminates may be nested in mere contact with each other, also, if desired, each laminate may be provided with a cross section smaller than that of the next adjacent laminate nested therein. When such laminates are assembled, each outer laminate will firmly and resiliently embrace and grip the next adjacent inner laminate, thus increasing the interfacial friction between the laminates during deformation of the spring. In this connection, it is preferred that the radius of the bight portion of each outer laminate be less than the radius of the bight portion of the next adjacent inner laminate. It is also preferred that each outer laminate be dimensioned so that when it is in its unassembled condition, its legs will be spaced apart a distance less than the spacing of the next adjacent inner laminate. As can be seen in FIG. 3, the U-spring is mounted to the respective plates in a manner such that the connecting bight or web portion does not begin immediately adjacent the edges of the plate but is spaced outwardly therefrom. However, if desired, the springs, whether incorporating gapped laminates or not, may be positioned relative to the plate so that the bight or web portion begins immediately adjacent the edges of the plate in order to provide a spring characteristic varying from that of the case where the bight portion does not begin immediately adjacent the edges of the plate. Thus, it will be apparent that the spring characteristics of the suspension system may be modified as desired not only by varying the configuration of the bight or web portion of the spring but also by varying the location of the web portion relative to the plate connected by the U-spring. Also, it should be apparent that while in the specific embodiment shown, the U-springs are constructed and configured to provide the same stiffness with respect to translation along the X-, Y-, and Z-axes of the suspension element, if desired, the characteristics or configuration of the two sets of U-springs 50 and 52 and 66 and 68 may be different to provide different characteristics or stiffness with respect to and between the X-, Y- and Z-axes of the suspension element.

Where an isolator constructed in accordance with this invention incorporates U-springs wherein the laminates are gapped, the U-springs themselves will provide virtually no friction damping. Therefore, in accordance with this invention, friction dampers 16 are provided as integral parts of the suspension unit. In the embodiment shown, the suspension unit is provided with four balanced friction dampers 16. Two dampers 16 are provided to be positioned adjacent opposite sides of top plate 48 as seen in FIG. 1 and the other two dampers 16 are positioned inside the wall of the portion of bracket 12 between openings 28 and 30 so as to be adjacent backup strips 64 which are connected to the centerplate 46 as seen in FIG. 3.

Figure 6:
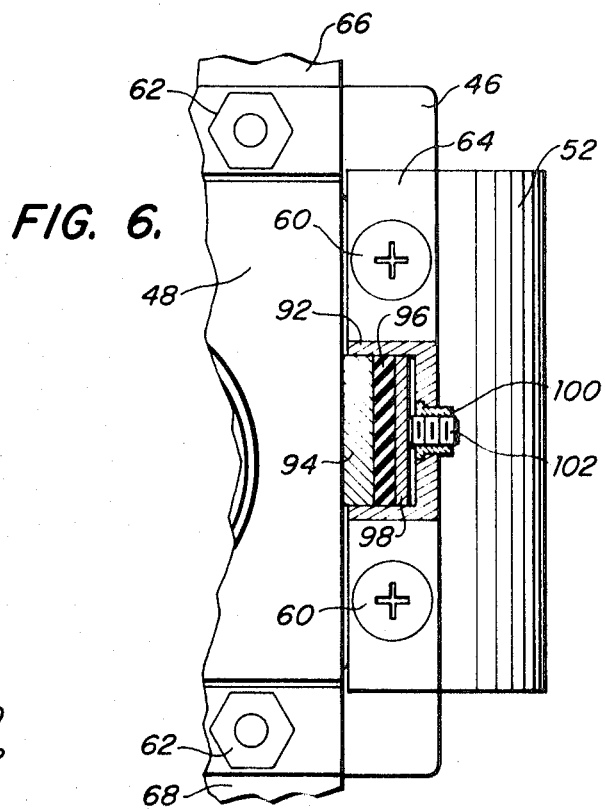
FIG. 6 is an enlarged, partial cross-sectional view of a portion of the isolator shown in FIG. 2.
Figure 7:
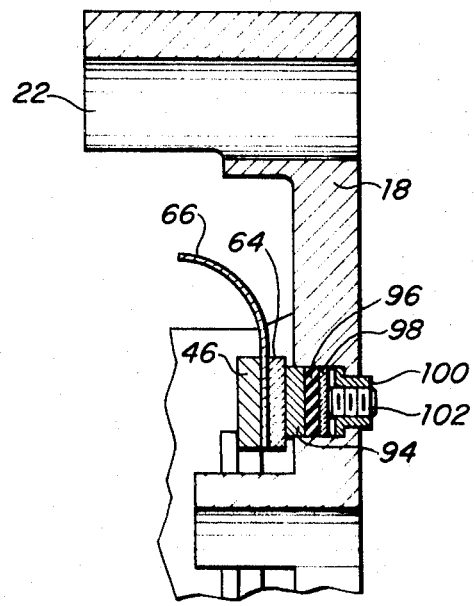
FIG. 7 is a blowup view of a cross section of a portion of the isolator as shown in FIG. 5.

Each of the friction dampers 16 is identical in construction. In the case of the two dampers adjacent top plate 48 they are housed in two housings 90 and 92 which are formed integrally with the two backup strips 64 used to mount springs 50 and 52 to centerplate 46. (See FIGS. 1 and 5). In the case of the other two dampers 16, they are positioned inside the wall of the vertical portion 18 of bracket 12 between openings 28 and 30 as seen in FIGS. 3 and 6. Each damper 16 comprises a flat strip of friction material 94 backed by a flat rubber backer 96 which in turn is backed by a flat metal plate 98. A threaded insert 100 projects from inside the wall beyond the surface of vertical portion 18 or from inside housing 90 and 92 beyond the outer surfaces thereof. A threaded screw 102 is threadably engageable with insert 100 so that screw 102 may be adjusted to bear against plate 98 with either increasing or decreasing pressure. In the case of the dampers 16 enclosed in housings 90 and 92, their friction materials 94 bear against flanges (cannot be seen) which are formed on the sides of top plate 48 directly adjacent friction materials 94. In the case of the two dampers 16 enclosed in the wall of vertical portion 18 of bracket 12, their friction materials bear against the backup strips 64 which are used in fixing springs 66 and 68 to centerplate 46.

Preferably, the friction material 94 is made of a graphite-impregnated phenolic resin. However, other types of synthetic thermosetting resins as well as nylon, and certain metals could be employed as the friction material. However, the greatest efficiency and wear was obtained from the phenolic resin. Furthermore metal friction materials have a tendency to squeak. Whatever friction material is employed, it must have a constant coefficient of friction so that once screw 102 is adjusted to provide a particular friction value, that coefficient of friction does not change with either time or temperature. Friction damping is important because in the absence of friction or so-called Coulomb-type damping, the transmissibility of the mass goes to infinity at resonance or the natural frequency. The damping coefficient Q should be selected by setting a particular value of friction damping so as to maintain the transmissibility of the mass at a specified level at resonance. Once the friction damping is set for a given system, it is desired to maintain constant damping so that the selected Q setting (usually, for example, between one and 10) does not change. The metal plate 98 permits uniform pressure to be applied by screw 102 all across the surface of the plate. Rubber backer 96 maintains a constant force on the friction material 94 and compensates for any wear of the friction material.

The surface shape of the flat friction material 94 and backer 96, and plate 98 may be selected from any of a number of configurations. The surface shape of each may be rectangular, square, circular or any other desired configuration. The area of the surface of each of these members has no effect on the friction provided but only effects how fast the material wears. It has been found that the rectangular shape is preferable because it wears the longest.

As previously mentioned, the number and positioning of friction dampers 16 is such as to provide balanced friction damping in that the application of motion in any direction generates friction forces or moments only in the direction of applied motion and not in the direction of the other five coordinates of motion. None of the dampers 16 should be focused at the elastic center 80 of the system so that friction damping is provided in the three coordinates of translational motion and also in the three coordinates of rotational motion. In the embodiment shown, the friction dampers 16 housed in housings 90 and 92 provide friction damping in the direction of the X- and Z-axes with respect to translational motion. The dampers 16, carried in the wall of vertical portion 18 of bracket 12, provide friction damping in the direction of the Y-axis with respect to translational motion.

Although the embodiment of the present invention as described and shown in the figures has freedom of movement in two translational degrees of freedom, it is also possible to incorporated the present invention in an isolator having only tow degrees of freedom. As viewed from FIG. 3 such an embodiment of the present invention might have translational degrees of freedom in the directions of the X- and Y-axes but not in the direction of the Z-axis. Another embodiment of the invention having two degrees of freedom might have translational degrees of freedom in the directions of the X- and Z-axes but not in the direction of the Y-axis. Still another version could have degrees of freedom in the direction of the X- and Z-axes but not in the direction of the X-axis.

Since certain changes may be made in the above apparatus without departing from the scope of the invention herein involved, it is intended that all matter contained in the above description or shown in the accompanying drawings shall be interpreted in an illustrative and not in a limiting sense.

What is claimed is:

1. A vibration isolator suspension element for use in a vibration isolating system comprising:
   a first set of parallel spaced-apart U-springs;
   a second set of parallel, spaced-apart U-springs longitudinally extending at right angles to the first set of U-springs and in a general plane extending parallel to the general plane of the first set of U-springs;
   means for connecting said first and second set of U-springs in series relation;
   means for mounting one end of said suspension element on a supporting structure;
   means for mounting on the other end of said suspension element a mass to be supported; and
   means provided integrally with said suspension element for providing friction damping during both translational and rotational motion to which said supported mass may be subjected.

2. An element as set forth in claim 1 wherein said element is employed in a fully decoupled system.

3. An element as set forth in claim 1 wherein said friction damping means is positioned so as to provide balanced friction damping.

4. An element as set forth in claim 1 wherein said friction damping means are positioned so that the lines of action of said damping means are not focused at the elastic center of said isolating system.

5. An element as set forth in claim 1 wherein said friction damping means comprises a plurality of individual friction dampers positioned on an integral with said suspension element so as to provide balanced friction damping, each of said dampers including
   means for applying a friction force to said means for connecting said first and second sets of U-springs; and
   means for adjusting the amount of friction force applied by each of said friction-force-applying means.

6. An element as set forth in claim 5 wherein said means for applying a friction force comprises a relatively flat member made of a material having a substantially constant coefficient of friction.

7. An element as set forth in claim 6 wherein said material is a graphite-impregnated phenolic resin.

8. An element as set forth in claim 1 wherein said means for connecting said first and second set of U-springs includes adjustable means for accurately setting and maintaining the spring rate of each individual U-spring.

9. A vibration isolator suspension element for use in a vibration isolating system, said element comprising:
   a first set of parallel, spaced-apart U-springs;
   a second set of parallel, spaced-apart U-springs longitudinally extending at right angles to said first set and lying in a plane extending parallel to the general plane of said first set of U-springs;
   means for connecting said first and second set of U-springs in series relation so that the opposite ends of said suspension element corresponding to the opposite ends of the series connected sets of U-springs are relatively movable in two directions extending at right angles and lying in a common plane extending parallel to the general plane of said suspension element and are relatively movable in a third direction extending at right angles to the general plane of said suspension element;
   mean for mounting one end of said suspension element on a supporting structure with one end of each series connected sets of U-springs connected to the supporting structure;
   means for connecting the other end of each series connected sets of U-springs to a mass to be carried by the isolating system; each of said U-springs including a plurality of U-spring members each having a resiliently deformable web portion. The U-spring members of each U-spring being in nested relation with at least the web portions thereof being in spaced relation; and
   means provided integrally with said suspension element for providing friction damping during both translational and rotational motion to which said mass may be subjected;
   said friction damping means comprising a plurality of individual friction dampers positioned on and integral with said suspension element so that the lines of action of said dampers are not focused at the elastic center of said isolating system and so as to provide balanced friction damping.

10. An element as set forth in claim 9 wherein each of said dampers includes
    means for applying a friction force to said means for connecting said first and second sets of U-springs, said friction means comprising a relatively flat member made of a material having a substantially constant coefficient for friction; and
    means for adjusting the amount of friction force applied by each of said friction-force-applying means.

11. An element as set forth in claim 9 wherein said means for connecting said first and second set of U-springs includes adjustable means for accurately setting and maintaining the spring rate of each individual U-spring.

12. A vibration isolating system having an azimuth axis and comprising:
    a supporting structure;
    a plurality of suspension elements spaced angularly about said azimuth axis and each comprising a first set of parallel, spaced-apart U-springs to second set of parallel, spaced-apart U-springs, longitudinally extending at right angles to the first set of U-springs and in a general plane extending parallel to the general plane of the first set of U-springs;
    means connecting said first and second set of U-springs of each suspension element in series relation so that the opposite ends of each suspension element corresponding to the opposite ends of the series connected sets of U-springs are relatively movable in two directions extending at right angles and lying in a common plane extending parallel to the general plane of the suspension elements and are relatively movable in a third direction extending at right angles to the general plane of the suspension element;
    means for mounting one end of each suspension element on said supporting structure;
    means for mounting on the other end of each of the suspension elements a mass to be carried by the isolating system;
    the general plane of each suspension element extending at an acute angle to said azimuth axis, the U-springs of the suspension elements providing the sole resilient supporting force for a mass carried by the isolating system; and
    means provided integrally with each of said suspension elements for providing balanced friction damping during both translational and rotational motion to which said mass may be subjected.

* * * * *